US008038980B2

(12) United States Patent
Yang et al.

(10) Patent No.: US 8,038,980 B2
(45) Date of Patent: Oct. 18, 2011

(54) HYDROGEN STORAGE MATERIALS CONTAINING AMMONIA BORANE

(75) Inventors: Jun Yang, Ann Arbor, MI (US); Andrea Sudik, Canton, MI (US); Donald J. Siegel, Ann Arbor, MI (US); Shinichi Hirano, West Bloomfield, MI (US); Andrew Robert Drews, Ann Arbor, MI (US); Christopher Mark Wolverton, Evaston, IL (US)

(73) Assignee: Ford Motor Company, Dearborn, MI (US)

( * ) Notice: Subject to any disclaimer, the term of this patent is extended or adjusted under 35 U.S.C. 154(b) by 208 days.

(21) Appl. No.: 12/499,413

(22) Filed: Jul. 8, 2009

(65) Prior Publication Data

US 2011/0008693 A1    Jan. 13, 2011

(51) Int. Cl.
*H01M 8/04* (2006.01)
*C01B 3/02* (2006.01)

(52) U.S. Cl. ............. 423/648.1; 502/526; 423/285; 423/413; 252/188.25

(58) Field of Classification Search .......... 96/108; 423/248, 276, 284–286, 294, 413, 648.1, 423/658.2; 206/0.7; 502/526; 252/188.25; 429/421, 416
See application file for complete search history.

(56) References Cited

U.S. PATENT DOCUMENTS

| 7,285,142 | B1 * | 10/2007 | Mohajeri et al. ............. 48/61 |
| 7,316,788 | B2 | 1/2008 | Autrey et al. |
| 7,329,470 | B2 | 2/2008 | Adams et al. |
| 7,361,213 | B2 * | 4/2008 | Narula et al. ............. 96/108 |
| 7,716,506 | B1 * | 5/2010 | Surgutchik et al. ......... 713/321 |
| 7,745,027 | B2 * | 6/2010 | Mohajeri et al. ............ 429/423 |
| 2005/0180916 | A1 | 8/2005 | Autrey et al. |
| 2006/0138996 | A1 | 6/2006 | Graham et al. |
| 2006/0292068 | A1 | 12/2006 | Stephens et al. |
| 2007/0116623 | A1 | 5/2007 | Chen et al. |
| 2007/0151153 | A1 | 7/2007 | Xu et al. |
| 2007/0231254 | A1 | 10/2007 | Gross |
| 2007/0271844 | A1 | 11/2007 | Mohring et al. |
| 2007/0292732 | A1 | 12/2007 | Feaver et al. |
| 2008/0014479 | A1 | 1/2008 | Fiebig |
| 2008/0138675 | A1 | 6/2008 | Jang et al. |
| 2008/0274033 | A1 * | 11/2008 | Meisner et al. ............. 423/413 |
| 2009/0274613 | A1 * | 11/2009 | Hamilton et al. ............ 423/648.1 |
| 2010/0329974 | A1 * | 12/2010 | Chen et al. ............... 423/648.1 |
| 2011/0070152 | A1 * | 3/2011 | Abdur-Rashid et al. ...... 423/657 |

FOREIGN PATENT DOCUMENTS

| JP | 2005-203188 A | 7/2005 |
| JP | 2006-213563 A | 8/2006 |
| JP | 2007-070203 A | 3/2007 |
| WO | 2007/002039 A2 | 1/2007 |
| WO | WO 2009/072989 A2 * | 6/2009 |

OTHER PUBLICATIONS

K.R. Graham et al, "High capacity hydrogen storage in a hybrid ammonia borane-lithium amide material", Mar. 2009, Energy Environ. Sci., 2009, 2, 706-710.*
Communications, Nanoscaffold Mediates Hydrogen Release and the Reactivity of Ammonia Borane, by Anna Gutowska, Liyu Li, Yongsoon Shin, Chongmin M. Wang, Xiaohong S. Li, John C. Linehan, R. Scott Smith, Bruce D. Day, Benjamin Schmid, Wendy Shaw, Maciej Gutowski, and Tom Autrey, et al., 2005, pp. 3578-3582.
Ammona-borane: the hydrogen source par excellence, by Frances H. Stephens, Vincent Pons and R. Tom Baker, May 3, 2007 pp. 2613-2626, This Journal is the Royal Society of Chemistry 2007.
Ab initio investigation of ammonia-borane complexes for hydrogen storage, Caetano R. Miranda and Gerbrand ceder, The Journal of Chemical Physics 126, published May 10, 2007.
Thermal decomposition of polymeric aminoborane (H2BNH2) under hydrogen release, J. Baumann, F. Baitalow, G. Wolf, Jan. 20, 2005, pp. 9-14.
Thermal decomposition of B-N-H compounds investigated by using combined thermoanalytical methods, by F. Baitalow, J. Baumann, G. Wolf, K. Jaenicke-Robler, G. Leitner, Feb. 1, 2002. pp. 159-168.
Fuelcellworks, Ammona Borane-Putting the fuel in fuel cells, Publication Date: Sep. 11, 2006, Fuel Cell Works Supplemental News Page, Jul. 2008.
Hydrogen Storage Sub-Program Overview, FY 2006 Annual Progress Report, pp. 273-279.
JACS Communications, Amineborane-Based Chemical Hydrogen Storage: Enhanced Ammonia Borane Dehydrogenation in Ionic Liquids, Martin E. Bluhm, Mark G. Bradley, Robert Butterick III, Upal Kusari, and Larry G. Sneddon, Mar. 27, 2006, J. Am Chem Soc, vol. 128, No. 24.
Base Metal Catalyzed Dehydrogenation of Ammonia-Borane for Chemical Hydrogen Storage, Richard J. Keaton, Johanna M. Blacquiere, and R. Tom Baker, Oct. 2, 2006.
Thermal decomposition of ammonia-borane under pressures up to 600 bar, F. Baitalow, G. Wolf, J. P.E. Grolier, F. Dan, S.L. Randzio, Department of Physical Chemistry Freiberg University of Mining and Technology, 2005.
Material Matters, Chemistry Driving Performance, Hydrogen Storage Materials, Aldrich, Sigma-Aldrich, 2007, vol. 2, No. 2.
www.ngvglobal.com, NGV Global, Ammonia Borane Promising for Hydrogen Storage, Sep. 11, 2008.
Calcium Amidotrihydroborate: A Hydrogen Storage Material, Himashinie V.K. Diyabalanage et al., Angew, Chem, Int. Ed. 2007, pp. 1-4.

* cited by examiner

*Primary Examiner* — Frank Lawrence, Jr.
(74) *Attorney, Agent, or Firm* — Damian Porcari; Brooks Kushman P.C.

(57) ABSTRACT

According to at least one aspect of the present invention, an ammonia borane containing hydrogen storage material is provided to be present with substantially reduced formation of borazine or diborane. In at least one embodiment, the hydrogen storage material includes at least one ammonia borane ($NH_3BH_3$); and at least one amide of the formula $M(NH_2)_x$, wherein M is a cationic element or a combination of two or more cationic elements from groups 1 to 14 of the periodic table and x represents a total cationic charge to charge balance M.

20 Claims, 2 Drawing Sheets

HYDROGEN STORAGE MATERIALS CONTAINING AMMONIA BORANE

BACKGROUND

1. Technical Field

One or more embodiments of this invention relates to hydrogen storage materials containing ammonia borane and methods for supplying hydrogen.

2. Background Art

Hydrogen is desirable as a source of energy for many applications because its reaction with air produces a clean by-product of water. Hydrogen has increasingly been considered an environmentally benign energy carrier in the field of mobile or stationary applications.

However, use of hydrogen as an energy carrier has been met with many implementation challenges. For example, efficient storage and release of hydrogen is identified as one of the key practical obstacles to realizing a transition to hydrogen-powered vehicles.

SUMMARY

According to at least one aspect of the present invention, an ammonia borane containing hydrogen storage material is provided to be present with substantially reduced byproduct formation of borazine or diborane. In at least one embodiment, the hydrogen storage material includes at least one ammonia borane ($NH_3BH_3$), and at least one amide of the formula $M(NH_2)_x$, wherein M is a cationic element or a combination of two or more cationic elements from groups 1 to 14 of the periodic table and x represents a total cationic charge to charge balance M.

In at least another embodiment, M is selected from the group consisting of Ca, Mg, K, Al, Na, Li, and combinations thereof. In at least one particular embodiment, the amide is $LiAl(NH_2)_4$.

In at least yet another particular embodiment, $NH_3BH_3$ and $LiAl(NH_2)_4$ are present in a molar ratio in a range of between 3:1 to 15:1.

In at least yet another particular embodiment, $NH_3BH_3$ and $LiAl(NH_2)_4$ are present in a molar ratio of 9:1.

In at least yet another particular embodiment, dehydrogenation in an amount of up to 11 weight percent of the total weight of the at least one ammonia borane occurs at a hydrogen release temperature of between 70 to 145 degrees Celsius.

In at least yet another particular embodiment, dehydrogenation in an amount of up to 10 weight percent of the total weight occurs within 10 minutes of heating at a temperature of between 135 to 145 degrees Celsius.

In at least yet another embodiment, an amount of borazine or diborane incident to dehydrogenation of $NH_3BH_3$ is no greater than 100 parts per million.

In at least yet another embodiment, the at least one amide facilitates hydrogen release from $NH_3BH_3$ at a pressure of above 1 bar absolute.

According to at least another embodiment, the hydrogen storage material includes at least one ammonia borane ($NH_3BH_3$); and at least one amide of the formula $M(NH_2)_x$, wherein M is selected from the group consisting of Ca, Mg, K, Al, Na, Li, and combinations thereof and x is an integer of between 1 to 6.

According to at least another aspect of the present invention, a method is provided for generating hydrogen in a fuel cell vehicle. In at least one embodiment, the method includes providing a hydrogen storage material containing at least one ammonia borane ($NH_3BH_3$) and at least one amide of the formula $M(NH_2)_x$, M being a cationic element or a combination of two or more cationic elements from the groups 1 to 14 of the periodic table and x representing a total cationic charge to charge balance M, wherein dehydrogenation of the at least one ammonia borane is present with substantially reduced formation of borazine or diborane; and heating the hydrogen storage material to release hydrogen.

In at least another embodiment, the heating is carried out at a temperature of between 80 to 140 degrees Celsius.

In at least yet another embodiment, the step of providing includes providing a hydrogen storage material containing $LiAl(NH_2)_4$.

In at least yet another embodiment, the step of providing includes providing a hydrogen storage material containing at least one ammonia borane and at least one $LiAl(NH_2)_4$ present in a molar ratio of between 3:1 to 15:1.

DETAILED DESCRIPTION OF EMBODIMENTS OF THE INVENTION

Figure 1:
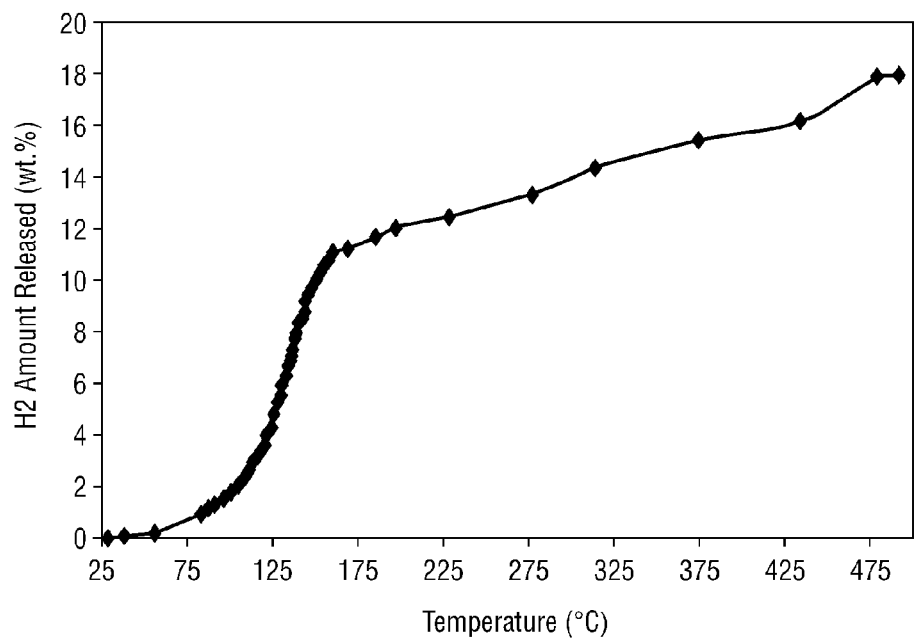
FIG. 1 illustratively depicts hydrogen release in weight percent from $NH_3BH_3$—$LiAl(NH_2)_4$ as a function of temperature up to 500° C. at a heating rate of 5° C./min.

As required, detailed embodiments of the present invention are disclosed herein. However, it is to be understood that the disclosed embodiments are merely exemplary of the invention that may be embodied in various and alternative forms. Therefore, specific structural and functional details disclosed herein are not to be interpreted as limiting, but merely as a representative basis for the claims and/or a representative basis for teaching one skilled in the art to variously employ the present invention.

Moreover, except where otherwise expressly indicated, all numerical quantities in the description and in the claims are to be understood as modified by the word "about" in describing the broader scope of this invention. Practice within the numerical limits stated is generally preferred. Also, unless expressly stated to the contrary, the description of a group or class of material is suitable or preferred for a given purpose in connection with the invention implies that mixtures of any two or more members of the group or class may be equally suitable or preferred.

Hydrogen storage has been identified as one of the primary barriers for enabling hydrogen fuel cell ($H_2FC$) and hydrogen internal-combustion engine ($H_2ICE$) vehicles to reach the mass market. To achieve full customer acceptance and commercial viability across all vehicle platforms, hydrogen fueled vehicles must adhere to the customer-discernable attributes (e.g., vehicle range, cost, performance, safety, etc.) of today's gasoline fueled vehicles. As current approaches to hydrogen storage based on compression or liquefaction of hydrogen suffer from high costs and low energy densities, these technologies may not satisfactorily achieve the certain performance targets set forth in the industry. To overcome this challenge, recent research and development efforts have focused on exploring "material-based storage", a method which utilizes compounds that physically or chemically bind hydrogen. Hydrogen can be subsequently released from the compounds by changing the temperature and/or pressure of the material storage system. Most importantly, materials-based storage can surpass the densities of compressed or liquefied hydrogen.

According to one or more embodiments of the present invention, hydrogen storage materials that use the elements nitrogen and boron to chemically bond hydrogen are provided. In these hydrogen storage materials hydrogen can then be "discharged" by a chemical reaction and the hydrogen is "recharged" by a chemical processing pathway. This makes them unique compared to metal hydride or sorbent materials where the hydrogen release and uptake is controlled by temperature and pressure. One compound in particular, ammonia borane (AB=$NH_3BH_3$) has received significant interest given its stability and commercial availability. Ammonia borane, isoelectronic with ethane, is a solid at room temperature, stable in air and water and contains about 100 to 140 grams hydrogen per liter.

$NH_3BH_3$ is a colorless solid that is stable at ambient temperature and soluble in relatively polar coordinating solvents with a melting point in the range of 110 to 114 degrees Celsius. $NH_3BH_3$ can decompose in two different routes: The reactions of hydrogen evolution according a first route can be summarized as shown in equations (i) through (iv).

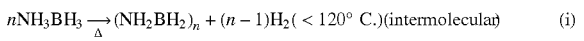

(i)

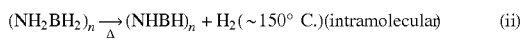

(ii)

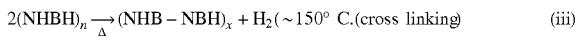

(iii)

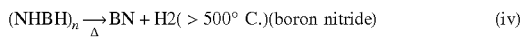

(iv)

The first two steps, reactions of AB, ammonia borane, to form PAB, polyaminoborane, $(NH_2BH_2)_n$, and PAB to form PIB, polyiminoborane, $(NHBH)_n$, amount to 12 mass % hydrogen. The hydrogen release in these first two steps occurs at temperatures less than 150° C. At a slightly higher temperature, the cross-linking between molecules is observed to release additional hydrogen. These materials are common intermediates used as precursors to boron nitride, which is formed at temperatures much greater than 500° C.

Alternatively, $NH_3BH_3$ can be decomposed according to a second route with the reactions summarized as shown in equations (v) to (viii).

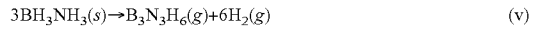

(v)

(vi)

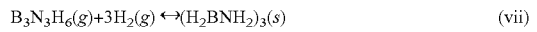

(vii)

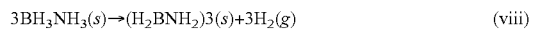

(viii)

As shown in the equations (v) to (viii), the decomposition of $BH_3NH_3$ can occur alternatively through the formation of cyclic polymeric compounds, such as borzaine ($B_3N_3H_6$), cyclotriborazane ($H_2BNH_2)_3$ (CTB), and polyborazylene $(B_3N_3H_4)_x$ (PB).

In practice, the hydrogen desorption of ammonia borane often involves its decomposition via both aforementioned routes, namely the first route through equations (i) to (iv) and the second route through equations (v) to (viii). Diborane ($B_2H_6$) is formed as a side product in a noticeable amount accompanying decomposition of borazine ($B_3N_3H_6$) at slightly higher temperature. Both diborane ($B_2H_6$) and borazine ($B_3N_3H_6$) are poisonous to the catalyst and reactive to the membrane of polymer electrolyte membrane of the PEM fuel cells. As such, effectively utilizing the hydrogen desorption potentials of ammonia borane while minimizing the formation of poisonous byproducts such as diborane ($B_2H_6$) and borazine ($B_3N_3H_6$) is advantageous and beneficial for hydrogen fuel cell applications.

Although containing a significant 20 weight percent of hydrogen, ammonia borane desorbs hydrogen through multiple steps during dehydrogenation reactions as indicated above. Conventional dehydrogenation reactions of ammonia borane often involve the formation of byproducts, such as diborane ($B_2H_6$) and borazine ($B_3N_3H_6$), both are combustive and toxic to polymer electrolyte membranes (PEM) of PEM fuel cells. Moreover, conventional dehydrogenation of ammonia borane at 85° C. needs several hours of incubation to start while an amount of hydrogen desorbed thereto is no greater than 7 weight percent. When the dehydrogenation of ammonia borane is carried out at a higher temperature, the combustive byproducts diborane and or borazine may constitute a major part of the desorbed products and hence post-reaction purification also becomes a hurdle.

Various conventional methods have been used in the art to dehydrogenate ammonia borane to release hydrogen. These conventional methods include: solid state thermal decomposition, hydrolysis, transition metal catalyzed dehydrogenation, ionic liquid catalyzed dehydrogenation, solution phase thermal decomposition, and nanophase ammonia borane encapsulated in SBA-15.

Solid state thermal decomposition relates to methods on the thermal dissociation of ammonia borane using thermonametry, pyrolysis, differential scanning calorimetry (DSC), differential thermal dissociation (DTA) and thermal dissociation analysis (TGA). DTA curves often reveal a sharp endothermic peak beginning at a temperature corresponding to the melting point of pure ammonia borane. Upon further heating, however, hydrogen release significantly slows and is often accompanied by the generation of volatile byproducts such as borazine. As such, the formation of volatile products in the absence of subsequent hydrogen purification may be problematic for PEM fuel cells that are easily fouled by contaminants in the hydrogen stream. Moreover, solid state dehydrogenation is often accompanied with various induction periods before $H_2$ release actually starts.

In-solution transition metal catalyzed dehydrogenation of ammonia borane is based on the mechanistic hypothesis that interactions between the ammonia borane molecule and the metal particle surface to form an activated complex which upon attack by a water ($H_2O$) molecule readily leads to a concerted dissociation of the B—N bond and hydrolysis of the resulting $BH_3$ byproduct to produce the boric acid and hydrogen ($H_2$).

However, because these dehydrogenation reactions are often carried out in aqueous solutions to effectuate the catalytic activities of the metal-containing catalysts, the presence of the aqueous solutions unnecessarily causes additional on-board space consumption and adds constraints to fuel cell compartment design window. Moreover, the metal catalysts used in these dehydrogenation reactions often need to be well characterized both in the active state and the inactive state such that the reaction pathway and kinetics for the amine borane dehydrocoupling may be elucidated. These characterization processes are themselves time consuming and relatively costly.

Dehydrogenation of ammonia borane in ionic fluids utilizes salts that are liquid at relatively moderate to high temperatures. Ionic liquids offer certain attributes including negligible vapor pressures, being stable at elevated temperatures, capable of dissolving a wide range of compounds and gases, weakly coordinating anions and cations that provide an inert reaction medium which can stabilize polar transition states, and being recyclable with little loss of activity.

However, ionic liquids are known to induce the formulation of certain impurities such as polar intermediates and transitions states. As such, post-dehydrogenation purification also becomes a challenge for using ionic fluid dehydrogenation system.

Solution phase thermal dehydrogenation relates to thermal decomposition of ammonia borane in selected solvents with the hope of identifying solvents and conditions suitable for preparing and carrying out reactions of $NH_2BH_2$ generated thermally from ammonia borane. Other than posing an unnecessary constraint for on-board space consumption, the solution phase thermal dehydrogenation also involves the generation of combustible byproducts such as borazine.

Nanophase ammonia borane is prepared, for example, by incorporating ammonia borane into channels of mesoporous silica. While affording certain benefits in reaction temperatures, the mesoporous silica support structure adds additional weight and/or volume to the final hydrogen storage materials.

Moreover, metal hydrides such as LiH and NaH have been indicated to be used in dehydrogenation reactions of ammonia borane. Anionic $H^-$ ions from LiH and NaH combine with cationic $H^+$ ions in the $NH_3$ cluster of ammonia borane to form some gaseous $H_2$ that is lost during the materials processing. Therefore, an effective hydrogen density of the combined metal hydrides with ammonia borane is subsequently decreased.

These conventional methods for dehydrogenating ammonia borane, while improve at various degrees hydrogen desorption kinetics, they have been met with limited use one way or another as detailed above. Moreover, the use of scaffolding, reactions in solution and in some instances acidic solutions with external catalysts, reactions with ionic liquids or other metal hydrides, unnecessarily introduces impurities and complexity to the dehydrogenation reaction of ammonia borane, the post-reaction removal of these impurities poses significant challenges to the efficiency of the entire fuel cell operation.

It has been found, according to one or more embodiments of the present invention, ammonia borane can be utilized as an effective hydrogen storage compound when coupled with a nitrogen-anionic amide compound as detailed herein, wherein the release of hydrogen is kinetically practical for an on-board fuel cell application and wherein the dehydrogenation reaction involve little or no formation of combustible byproducts such as borazine and diborane.

As used herein in one or more embodiments and unless otherwise noted, the term "hydrogen release" or "dehydrogenation" refers to liberation of hydrogen from the hydrogen storage material. It is not intended to indicate that complete release has necessarily occurred, and contemplates both a complete release and a partial release resulting from liberation of at least part of the hydrogen content of the material.

According to one or more embodiments of the present invention, a series of hydrogen storage materials are provided to be useful for generating hydrogen in mobile and stationary applications. The mobile and stationary applications include fuel cell vehicles, hydrogen ICE vehicles, energy storage for intermittent power generation. At least a portion of these reactions, as described in more detail herein elsewhere, are identified to have favorable gravimetric density of the range of 5-9 weight percent (defined as 5-9 grams hydrogen per 100 grams) and volumetric density of 85-100 grams hydrogen per liter of a respective hydrogen storage material.

According to at least one aspect to the present invention, a hydrogen storage material is provided for storing and releasing hydrogen. In at least one embodiment, the hydrogen storage material includes at least one ammonia borane ($NH_3BH_3$), and at least one amide of the formula (1)

$$M(NH_2)_x \tag{1}$$

M being a cationic element or a combination of two or more cationic elements from the groups 1 to 14 of the periodic table and x representing a total cationic charge to charge balance M, wherein dehydrogenation of the at least one ammonia borane is present with substantially reduced formation of borazine or diborane.

It has been found the $BH_3$ cluster of ammonia borane can be advantageously utilized, by breaking B—H bonds contained therein, to form mixture with one or more amide as defined herein. Without being limited to any particular theories, one of the mechanisms that dehydrogenation of the hydrogen storage material according to one or more embodiments of the present invention can be carried out in a relatively workable temperature range suitable for on-board fuel cell operation may be due to a synergistic interplay among the following several factors: the relatively weak B—H bond of the $BH_3$ cluster within ammonia borane, one or more amide designed to attack the relatively weak B—H bonds of $BH_3$ cluster, the amide being additional hydrogen donor, and reduction or elimination of byproduct formation facilitated through low temperature dehydrogenation operation.

It has been found, according to one or more embodiments of the present invention, ammonia borane may be used in a hydrogen storage material for storing and releasing hydrogen and in certain particular instance, in applications for on-board fuel cell vehicles. The ammonia borane based hydrogen storage materials can be utilized to release a substantial amount of hydrogen at operating temperatures and/or pressures suitable for use in on-board fuel cell applications. More particularly, the ammonia borane based hydrogen storage materials, according to one or more embodiments of the present invention, are so formulated as to release hydrogen with no substantial formation of dehydrogenation reaction byproducts such as borazine or diborane. In certain particular embodiments, the dehydrogenation of the ammonia borane based hydrogen storage materials involves the formation of borazine or diborane in an amount no greater than 100 parts per million and in certain other particular embodiments, the amount of borazine or diborane incidental to the dehydrogenation reaction of the ammonia borane based hydrogen storage material is below conventional detection levels.

It has also been found the inclusion of an amide of the formula $M(NH_2)_x$, as defined herein according to one or more embodiments of the present invention, synergistically improves the hydrogen releasing kinetics of ammonia borane as a high-density hydrogen storage compound. As will be discussed in more detail herein elsewhere, a stage two hydrogen release corresponding to reactions (ii) and (iii), typical of neat ammonia borane that generally occur at a temperature beyond the DOE recommended upper limit of 140 degrees Celsius, can be effectuated at a much lower temperature within the current DOE guidelines, or at or below about 140 degrees Celsius.

It is appreciated that the amide of the formula $M(NH_2)_x$, according to one or more embodiments of the present invention, is itself a hydrogen containing compound and can function as a secondary hydrogen donor within the hydrogen storage material. As such, the amide $M(NH_2)_x$, while synergistically potentiates dehydrogenation of ammonia borane, also donates additional hydrogen content into the storage materials. Therefore, the hydrogen storage material can be formulated to minimize the potential dilution as to the volumetric density or the gravimetric density of the ammonia borane by the inclusion of the amide $M(NH_2)_x$ that is, as stated herein, both a dehydrogenation potentiator and a hydrogen donor.

It has been found that the hydrogen storage material according to one or more embodiments of the present invention can be in a dry solid form, the dehydrogenation thereof is facilitated by suitable heating as described herein elsewhere. This being said, it is understood that additional liquid ingredients or other impurities such as scaffolds may be added in for further performance adjustment, but these additions are not necessary and sometimes are not preferred for carrying out the present invention.

As used herein, the group 1 elements of the periodic table include lithium (Li), sodium (Na), potassium (K), rubidium (Rb), caesium (Cs), and francium (Fr).

The group 2 elements include beryllium (Be), magnesium (Mg), calcium (Ca), strontium (Sr), barium (Ba) and radium (Ra).

The group 3 elements include scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), actinium (Ac), thorium (Th), protactinium (Pa), uranium (U), neptunium (Np), plutonium (Pu), americium (Am), curium (Cm), berkelium (Bk), californium (Cf), einsteinium (Es), fermium (Fm), mendelevium (Md), nobelium (No), and lawrencium (Lr).

The group 4 elements include titanium (Ti), zirconium (Zr), hafnium (Hf), and rutherfordium (Rf).

The group 5 elements include vanadium (V), niobium (Nb), tantalum (Ta), and dubnium (Db).

The group 6 elements include chromium (Cr), molybdenum (Mo), tungsten (W), and seaborgium (Sg).

The group 7 elements include manganese (Mn), technetium (Tc), rhenium (Re), and bohrium (Bh).

The group 8 elements include iron (Fe), ruthenium (Ru), osmium (Os) and hassium (Hs).

The group 9 elements include cobalt (Co), rhodium (Rh), iridium (Ir), and meitnerium (Mt).

The group 10 elements include nickel (Ni), palladium (Pd), platinum (Pt), and darmstadtium (Ds).

The group 11 elements include copper (Cu), silver (Ag), gold (Au), and roentgenium (Rg).

The group 12 elements include zinc (Zn), cadmium (Cd), mercury (Hg), and ununbium (Uub).

The group 13 elements include boron (B), aluminum (Al), gallium (Ga), indium (In), thallium (Tl), and ununtrium (Uut).

The group 14 elements include carbon (C), silicon (Si), germanium (Ge), tin (Sn), lead (Pb), and ununquadium (Uuq).

In a least one particular embodiment, M of the amide $M(NH_2)_x$ is selected from the group consisting of Ca, Mg, K, Al, Na, Li, and combinations thereof. Non-limiting examples of the amide $M(NH_2)_x$ include $Mg(NH_2)_2$, $KAl(NH_2)_4$, $NaAl(NH_2)_4$, $LiAl(NH_2)_4$, $Ca(NH_2)_2$, and $MgCa(NH_2)_4$.

In at least another particular embodiment, the amide $M(NH_2)_x$ within the hydrogen storage material is $LiAl(NH_2)_4$. The ammonia borane and $LiAl(NH_2)_4$, are present in a molar in a range of between 3:1 to 15:1, of between 4:1 to 14:1, of between 5:1 to 13:1, of between 6:1 to 12:1, of between 7:1 to 11:1 and in certain particular instance of 9:1.

In at least yet another particular embodiment, the hydrogen storage material is formulated such that an amount of hydrogen releasable is up to 11 weight percent of the total weight of the ammonia borane at a temperature of between 70 to 145° C.

In at least yet another particular embodiment, the hydrogen storage material is formulated such that an amount of hydrogen releasable up to 10 weight percent of the total weight of the ammonia borane occurs within 10 minutes of heating at a temperature of between 135 to 145° C.

In at least yet another particular embodiment, the hydrogen storage material is formulated such that an amount of borazine or diborane incidental to dehydrogenation of the ammonia borane is not greater than 100 parts per million.

In at least yet another particular embodiment, the hydrogen storage material may be mechanically processed into a preactivated form. For some applications, the mechanical process serves simply to agitate or stir the hydrogen storage material. In one particular embodiment, the mechanical process reduces the size of the particles in the hydrogen storage materials.

The mechanical processing methods illustratively include mixing, grinding, milling, or combinations thereof. In certain situations, the following mechanical processes are used: manual mixing, mechanically assisted mixing, ball milling, manual grinding, attritor milling, sand milling, horizontal milling, vertical milling, jet milling, jaw crusher milling, hammer milling, and high pressure dispersion milling.

The milling process can be any one or combination of milling processes known in the art. For example, the milling process can include media made of granular material (i.e., media milling). Some examples of suitable media milling processes include ball milling, attritor milling, sand milling, horizontal milling, and vertical milling.

In certain applications, hydrogen storage materials may be subjected to particle size reduction using an exemplary high energy planetary ball milling method. A stainless steel mill vial about the size of 250 cubic centimeters is equipped with a pressure transducer and thermometer, which allow instantaneous radio transmission of pressure and temperature data during milling. Milled materials may be evaluated by two means: 1) temperature programmed desorption (TPD), whereby the material being tested is heated at a constant rate such as 2 degrees Celsius per minute, and the released hydrogen and other gas signals are monitored; 2) the materials are decomposed at a fixed temperature and the evolved hydrogen is collected. Ball milled material particle sizes are roughly estimated from scanning electron microscope (SEM) examination. X-ray diffraction (XRD) studies are performed on as-ball-milled, partially desorbed and fully desorbed samples.

The hydrogen storage material can also be in any suitable physical form. For example, the hydrogen storage and desorption material can be in particulate form, e.g., powder, crystalline, polycrystalline, microcrystalline, pelletized, granular, and so on.

The size of the particles is not particularly critical to the operability of the present invention. For example, any one or more dimensions of the particles can be 1 centimeter or less, 50 millimeters or less, 40 millimeters or less, 30 millimeters or less, 20 millimeters or less, 10 millimeters or less, 1 millimeter or less, 500 micrometers or less, 250 micrometers or less, 100 micrometers or less, 50 micrometers or less, 20 micrometers or less, 10 micrometers or less, 1 micron or less, 500 nanometers or less, 250 nanometers or less, 100 nanometers or less, 50 nanometers or less, and so on.

The particles of hydrogen storage material can also have any of several morphologies. For example, the particles can be approximately spherical, oblong, rectangular, square planar, trigonal bipyramidal, cylindrical, octahedral, cuboctahedral, icosahedral, rhombohedral, rod-shaped, cuboidal, pyramidal, amorphous, and so on.

Alternatively, the hydrogen storage material can be in nonparticulate form, e.g., in block form, in sheet form, as a coating, a film, an interconnected or interwoven network, or a combination thereof.

EXAMPLE

A hydrogen storage material "N" is provided to contain 83% by weight $NH_3BH_3$ and 17% by weight $LiAl(NH_2)_4$ with approximately a 9:1 molar ratio of $NH_3BH_3:LiAl(NH_2)_4$.

As shown in FIG. 1, the hydrogen storage material "N" exhibits a total hydrogen dehydrogenation capacity of 18 percent by weight at a temperature of about 500° C. At temperatures of between 75° C. to 145° C., the hydrogen release as a function of heating temperature is seen with a steep acceleration and reaches a significant 11 percent by weight at a temperature of only about 145° C., a temperature that is realistic for application in an on-board fuel cell.

Figure 2A:
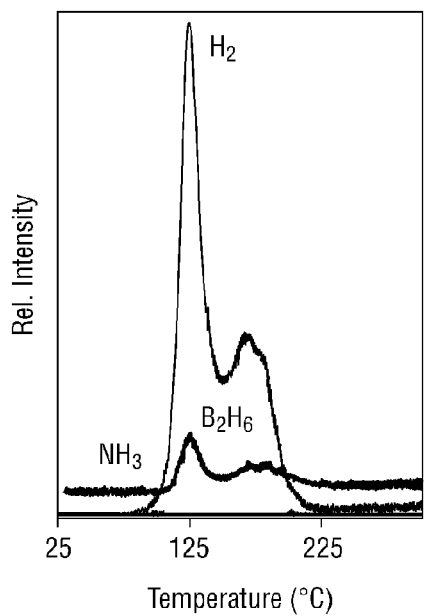
FIG. 2A illustratively depicts temperature-programmed desorption mass spectroscopy of neat $NH_3BH_3$ at a heating rate of 5° C./min.
Figure 2B:
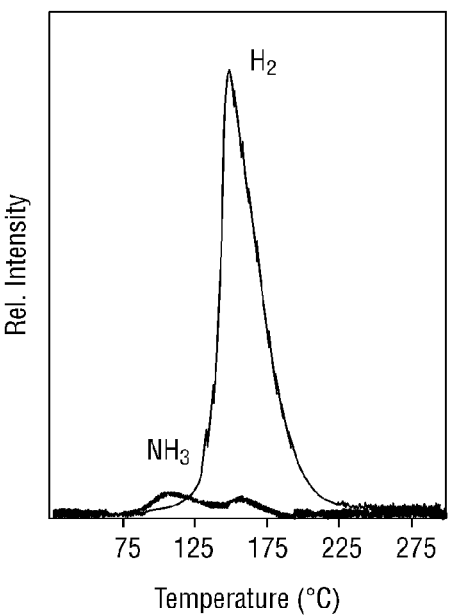
FIG. 2B illustratively depicts temperature-programmed desorption mass spectroscopy of $NH_3BH_3$—$LiAl(NH_2)_4$ at a heating rate of 5° C./min in relation to FIG. 2A.

FIGS. 2A and 2B illustrate temperature-programmed desorption mass spectroscopy at a heating rate of 5 degrees Celsius per minute comparably between pure $NH_3BH_3$ and $NH_3BH_3$—$LiAl(NH_2)_4$ mixture. The sample is heated at a fixed heating rate, usually 5 degrees Celsius per minute, in an Argon carrier gas at a flow of 100 sccm. Evolved gases are monitored using the temperature-programmed desorption mass spectroscopy. FIG. 2A corresponds to 100 weight percent $NH_3BH_3$ and FIG. 2B corresponds to 83 weight percent $NH_3BH_3$. It is noted that combustible impurities such as $B_2H_6$ are found to be below detectable limit based on the experimental conditions in this example. More importantly, at least a portion of the hydrogen released otherwise at a temperature about 180° C. is now released at about 140° C.

Figure 3:
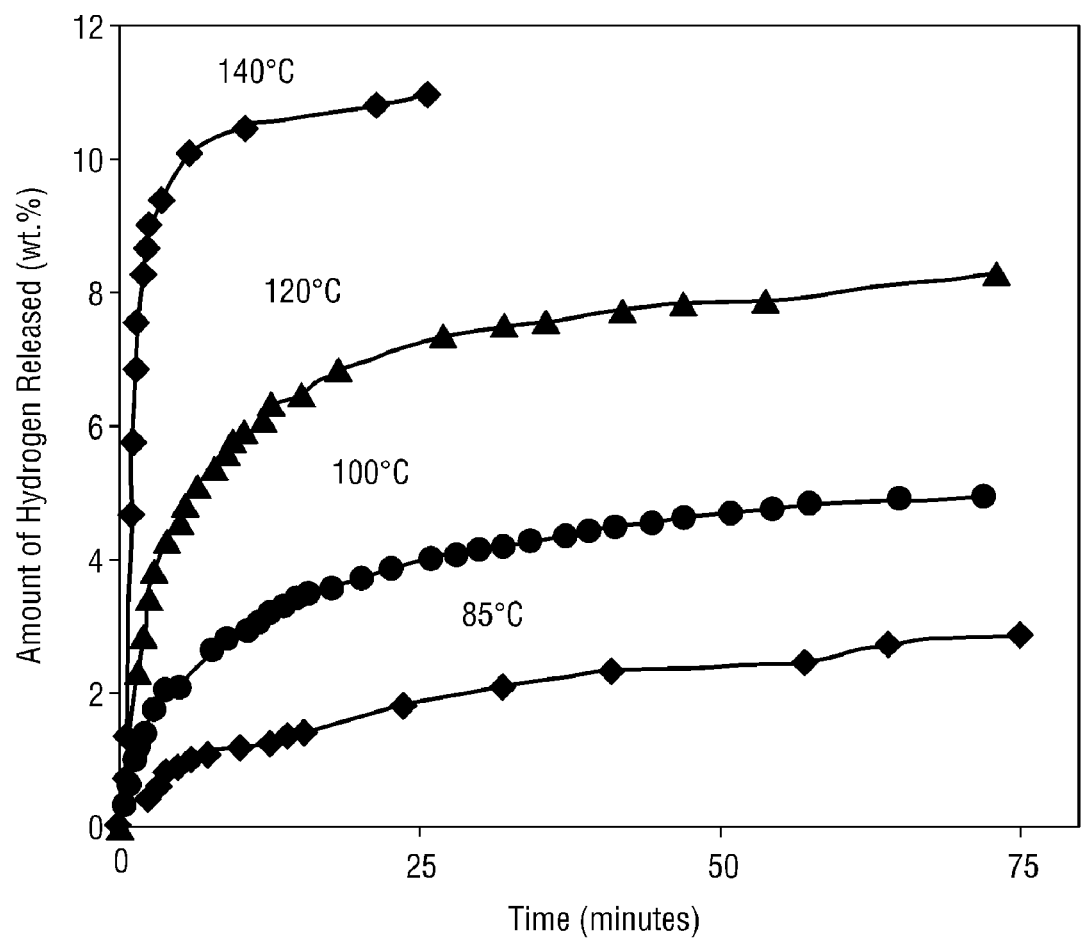
FIG. 3 illustratively depicts hydrogen release kinetics of $NH_3BH_3$—$LiAl(NH_2)_4$ at variable temperatures as indicated.

FIG. 3 shows dehydrogenation of the $NH_3BH_3$—$LiAl(NH_2)_4$ mixture as a function of time under various heating temperatures. As shown in FIG. 3, dehydrogenation kinetics are heavily dependent on the heating temperatures. At the heating temperature of 140° C., 10 weight percent of hydrogen is released within 5 minutes of the initiation of heating and by a reasonable 25 minutes, 11 weight percent of hydrogen is released.

While the best mode for carrying out the invention has been described in detail, those familiar with the art to which this invention relates will recognize various alternative designs and embodiments for practicing the invention as defined by the following claims.

What is claimed:

1. A hydrogen storage material comprising:
   a dry solid combination of
   at least one ammonia borane ($NH_3BH_3$); and
   at least one amide of the formula (1)

$$M(NH_2)_x \qquad (1)$$

wherein M includes two or more cationic elements from groups 1 to 14 of the periodic table and x represents a total cationic charge to charge balance M.

2. The hydrogen storage material of claim 1, wherein M includes two or more elements of Ca, Mg, K, Al, Na, and Li.

3. The hydrogen storage material of claim 1, where the amide is $LiAl(NH_2)_4$.

4. The hydrogen storage material of claim 3, wherein $NH_3BH_3$ and $LiAl(NH_2)_4$ are present in a molar ratio in a range of between 3:1 to 15:1.

5. The hydrogen storage material of claim 3, wherein $NH_3BH_3$ and $LiAl(NH_2)_4$ are present in a molar ratio of 9:1.

6. The hydrogen storage material of claim 1, wherein dehydrogenation in an amount up to 11 weight percent of the total weight of the at least one ammonia borane occurs at a temperature of between 70 to 145 degrees Celsius.

7. The hydrogen storage material of claim 1, wherein dehydrogenation in an amount up to 10 weight percent of the total weight of the at least one ammonia borane occurs within 10 minutes of heating at a temperature of between 135 to 145 degrees Celsius.

8. The hydrogen storage material of claim 1, wherein an amount of borazine or diborane incidental to dehydrogenation of the at least one ammonia borane is no greater than 100 parts per million.

9. The hydrogen storage material of claim 1, wherein the at least one amide enables dehydrogenation of the at least one ammonia borane at a pressure of above 1 bar absolute.

10. A hydrogen storage material comprising:
    a dry solid combination of
    at least one ammonia borane ($NH_3BH_3$); and
    at least one amide of the formula (1)

$$M(NH_2)_x \qquad (1)$$

wherein M is selected from the group consisting includes two or more elements of Ca, Mg, K, Al, Na, and Li, and x is an integer of from 2 to 6.

11. The hydrogen storage material of claim 10, wherein $NH_3BH_3$ and $M(NH_2)_x$ are present in a molar ratio in a range of between 3:1 to 15:1.

12. The hydrogen storage material of claim 10, wherein $NH_3BH_3$ and $M(NH_2)_x$ are present in a molar ratio of 9:1.

13. The hydrogen storage material of claim 10, wherein dehydrogenation in an amount of up to 11 weight percent of the total weight of the at least one ammonia borane at a temperature of between 70 to 145 degrees Celsius.

14. The hydrogen storage material of claim 10, wherein dehydrogenation in an amount of up to 10 weight percent of the total weight of the at least one ammonia borane within 10 minutes of heating at a temperature of between 135 to 145 degrees Celsius.

15. The hydrogen storage material of claim 10, wherein an amount of borazine or diborane incidental to dehydrogenation of the at least one ammonia borane is no greater than 100 parts per million.

16. A method of providing hydrogen in a fuel cell vehicle, the method comprising:
    providing a hydrogen storage material containing a dry solid combination of at least one ammonia borane ($NH_3BH_3$) and at least one amide of the formula $$M(NH_2)_x$$

M including two or more cationic elements from groups 1 to 14 of the periodic table and x representing a total cationic charge to charge balance M; and
    elevating the temperature of the hydrogen storage material to release hydrogen.

17. The method of claim 16, wherein the temperature of the hydrogen storage material is elevated to be between 80 to 140 degrees Celsius.

18. The method of claim 16, wherein the step of elevating the temperature of the hydrogen storage material is carried out at a pressure of above 1 bar absolute.

19. The method of claim 16, wherein the step of providing includes providing a hydrogen storage material containing the at least one ammonia borane and at least one LiAl(NH$_2$)$_4$.

20. The method of claim 16, wherein the step of providing includes providing a hydrogen storage material containing at least one ammonia borane and at least one LiAl(NH$_2$)$_4$ present in a molar ratio of between 3:1 to 15:1.

* * * * *